Aug. 14, 1951     A. HAVENS     2,564,571
FOOD SERVING DEVICE
Filed Nov. 26, 1948

Inventor
Arthur Havens
Barthel & Bugbee
Attorneys

Patented Aug. 14, 1951

2,564,571

UNITED STATES PATENT OFFICE 2,564,571

FOOD SERVING DEVICE

Arthur Havens, Detroit, Mich.

Application November 26, 1948, Serial No. 61,949

1 Claim. (Cl. 65—65)

This invention relates to food serving devices and, in particular, to devices for serving fowl, such as fried chicken.

One object of this invention is to provide a combined plate- and food-holder having a portion upon which pieces of the fowl can be hung and having another portion which receives a plate adapted to hold the remainder of the meal, such as potatoes, vegetables, salads and other foods.

Another object is to provide a combined plate- and food-holder of the foregoing character wherein the food holder also serves as a handle or bail for carrying or lifting the plate and articles of food supported on the plate or by the handle or bail.

Another object is to provide a combined plate- and food-holder consisting of an arch-shaped member having plate-holding portions at its opposite ends and having hooks extending downward from its intermediate portions, the portions of the fowl being hung on these hooks.

Hitherto, in the serving of cooked fowl, such as fried chicken, the effort has been made by restaurateurs to provide novelty and variety in serving such food. Despite such efforts, however, fried fowl, such as fried chicken, is still served on the ordinary plate, with the meat and its gravy intermingling with the vegetables. Certain efforts have been made to serve fried chicken in baskets or other novelty containers, but the intermingling still exists. The use of plates with ridges or other partitions has alleviated this condition somewhat, but the results are still unsatisfactory.

The present invention provides a combined plate- and food-holder wherein the parts of the fowl are suspended from hooks entirely apart from the vegetables, salad, relishes or other articles served with the fowl. In brief, the device consists of an arch-shaped member having hooks extending downward at intervals from its lower surface. Secured to the opposite lower ends of the member are inwardly-facing fingers into which the opposite edges of the plate may be inserted. Thus, the various portions of a cooked fowl can be impaled on the hooks and the plate containing vegetables, and possibly a salad, held in the plate holder below the parts of the fowl.

Figure 1:
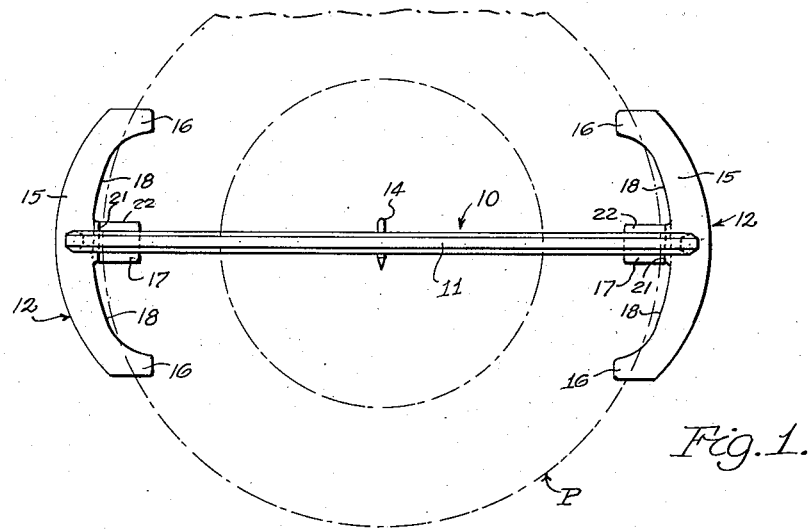
Figure 1 is a top plan view of a combined plate- and food-holder according to a preferred form of the present invention, the plate itself being indicated by chain lines.
Figure 2:
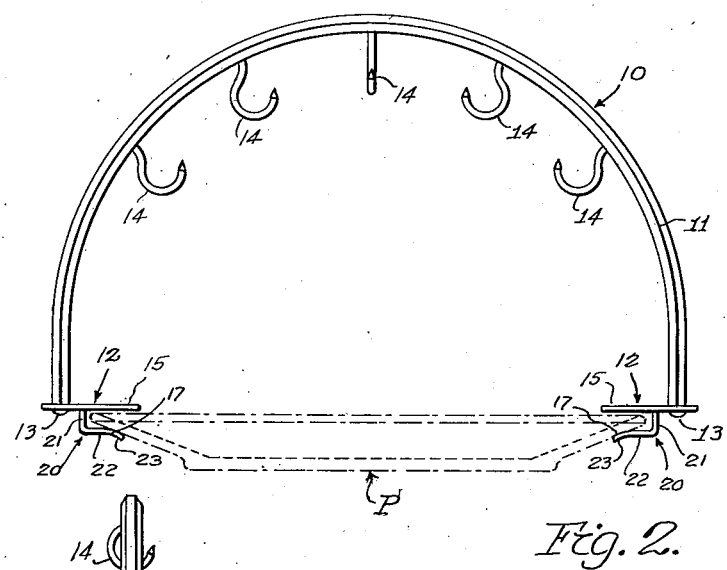
Figure 2 is a side elevation of the plate- and food-holder shown in Figure 1, with the plate likewise indicated in chain lines.

Referring to the drawings in detail, Figures 1 and 2 show a combined plate- and food-holder, generally designated 10, according to a preferred form of the invention as consisting of an arch-shaped bar 11 preferably of arcuate form having plate holders 12 secured as at 13 to its lower ends. The bar 11 is shown as being of approximately semi-circular arcuate form although the form may, of course, be varied somewhat. Secured to the under side of the bar 11 at intervals therealong are pointed hooks 14 from which the parts of the fowl may be hung.

The plate-holders 12 consist of arcuate or approximately crescent-shaped top members 15 having inwardly-projecting end fingers 16 and intermediate fingers 17 (Figure 1), the top members 15 being cut away as at 18 between the fingers 16 and 17. Extending downward from the top members 15 and integral therewith are angle members 20. The vertical arm portions 21 of the angle members 20 serve as stops for the plate P and the horizontal portions 22 thereof support the plate and have their outer ends 23 preferably bent downward slightly in order to facilitate insertion of the plate. The plate- and food-holder 10 is preferably constructed of stainless steel in order to render it easily cleaned. For convenience, the central hook 14 may be turned in a plane transverse to the plane of the bar 11, and also to avoid conflict between the various parts of the fowl while they are being inserted. For the same purpose, the points of the side hooks 14 may be faced in opposite directions (Figure 2).

Figure 3:
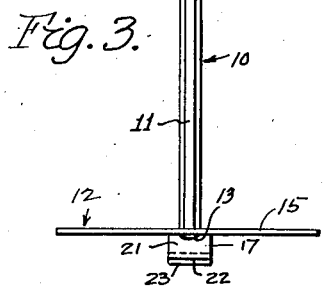
Figure 3 is an end elevation of the plate- and food-holder shown in Figures 1 and 2.

In the use of the invention, a plate P is inserted in the plate holders 12 as shown by the chain lines in Figures 2 and 3. The parts of the fowl, such as a leg, wing, half a breast, etc., are then impaled upon the hooks 14. The serving is then completed by placing the vegetables, salad, relish, etc., upon the plate P. The arrangement may consist of a salad in the center of the plate surrounded by shoe-string potatoes. The entire assembly may then be carried from the kitchen to the table and placed in front of the customer.

What I claim is:

A combined plate- and food-holder comprising an arch-shaped member adapted to extend over the central portion of the plate and having downwardly-extending lower end portions, sharply-pointed food-receiving hooks mounted on said arch-shaped member and extending downwardly therefrom at spaced intervals therealong, and a plate holder secured to each of said end portions, each plate holder having spaced upper and lower members with a recess therebetween for receiving the rim of the plate, and said food-receiving hooks being spaced inwardly from said plate-holder toward the central portion of the plate.

ARTHUR HAVENS.

REFERENCES CITED

The following references are of record in the file of this patent:

UNITED STATES PATENTS

| Number | Name | Date |
|---|---|---|
| 135,156 | Reed | Jan. 21, 1873 |
| 243,107 | Conger | June 21, 1881 |
| 511,189 | Barthold | Dec. 19, 1893 |
| 517,293 | Powell | Mar. 27, 1894 |
| 581,896 | Warren et al. | May 4, 1897 |
| 584,901 | Sherman | June 22, 1897 |
| 591,243 | Sherman | Oct. 5, 1897 |
| 786,546 | Chamberlin | Apr. 4, 1905 |
| 791,107 | Padden | May 30, 1905 |
| 955,646 | Jorey | Apr. 19, 1910 |
| 987,579 | Koenig et al. | Mar. 21, 1911 |
| 1,225,870 | Schwing | May 15, 1917 |
| 1,248,843 | Gay | Dec. 4, 1917 |
| 1,385,580 | Owen | July 26, 1921 |